United States Patent [19]
Paloheimo

[11] Patent Number: 5,848,688
[45] Date of Patent: Dec. 15, 1998

[54] COVER

[75] Inventor: Markus Arvo Hjalmar Paloheimo, Helsinki, Finland

[73] Assignee: Doppler Oy, Helsinki, Finland

[21] Appl. No.: 818,596

[22] Filed: Mar. 14, 1997

[51] Int. Cl.$^6$ ................................................. B65D 85/57
[52] U.S. Cl. ..................... 206/308.1; 206/309; 211/40; 312/9.58
[58] Field of Search ................................. 206/308.1, 307, 206/309, 313, 485; 211/40, 41.1; 312/9.58, 9.64

[56] References Cited

U.S. PATENT DOCUMENTS

| | | | |
|---|---|---|---|
| 4,875,743 | 10/1989 | Gelardi et al. | 206/309 |
| 5,180,058 | 1/1993 | Hu . | |
| 5,370,224 | 12/1994 | Karakane . | |
| 5,392,906 | 2/1995 | Taniyama | 206/308.1 |
| 5,423,434 | 6/1995 | Chen | 206/309 |
| 5,425,450 | 6/1995 | Lin | 206/308.1 |
| 5,547,078 | 8/1996 | Iida | 206/308.1 |

FOREIGN PATENT DOCUMENTS

| | | |
|---|---|---|
| 0615246 | 2/1994 | European Pat. Off. . |
| 4128644 | 8/1991 | Germany . |
| 4326315 | 8/1993 | Germany . |
| 9203823 | 5/1992 | WIPO . |

Primary Examiner—Paul T. Sewell
Assistant Examiner—Luan K. Bui
Attorney, Agent, or Firm—Ladas & Parry

[57] ABSTRACT

The present cover has a connector configuration that allows several identical covers to be joined together on top of each other to form a cover system.

The covers can be turned with respect to each other so that a label on the cover on the item inside the cover can be easily seen. The connector includes a cylindrical portion which, when mated to an identical cylindrical portion on another cover, permits a pivotable connection. The covers, when joined, can be rotated only in a direction parallel to main surfaces of the covers.

11 Claims, 2 Drawing Sheets

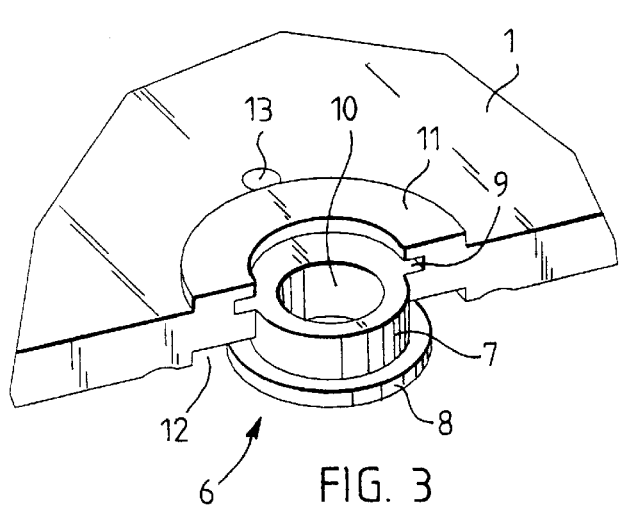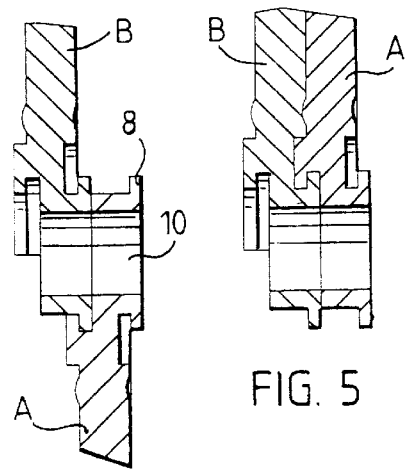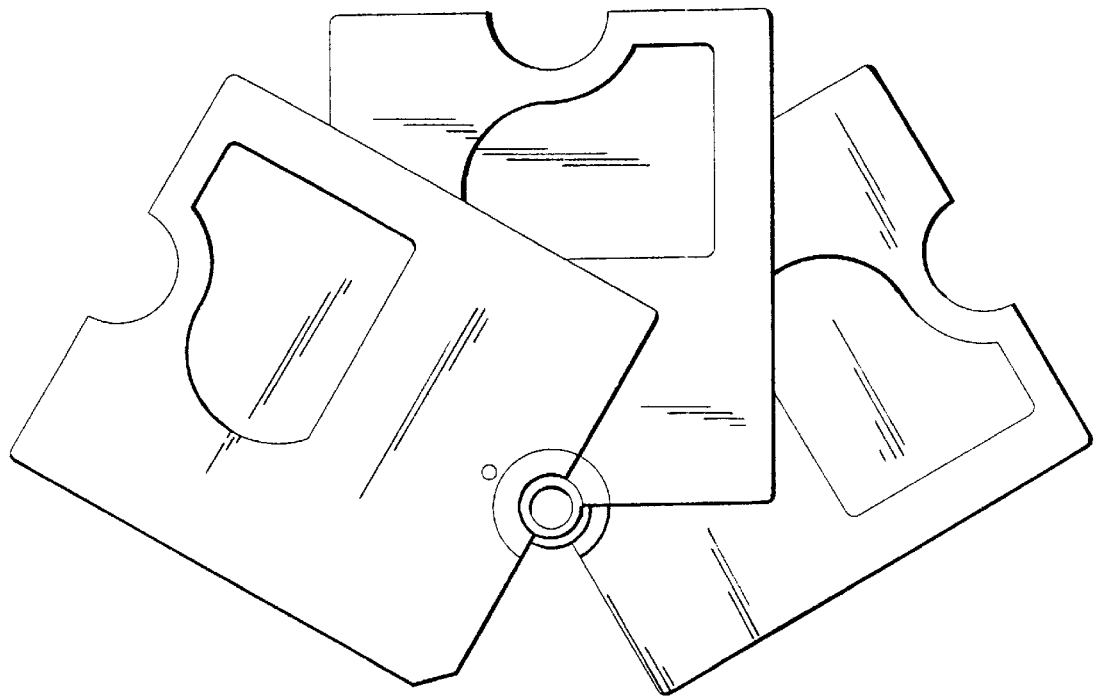

COVER

BACKGROUND OF THE INVENTION

The present invention relates to a cover for different kind of items, like computer diskettes, CD-ROMs and corresponding objects.

Covers for computer diskettes, CD-ROM or compact discs are known for example from the following references: U.S. Pat. No. 5,180,058 A, EP 0615246 A1, DE 4128644 A1 and DE 4326315 A1. These references show different kind of cover or holder systems or assemblies wherein several covers are joined together to form an assembly in which several objects can be stored. Especially the reference EP 0615246 A1 shows an assembly wherein covers for compact discs are combined to form a cover system. The covers are each equipped with a T profile extending from the back of the cover, the T profiles being suitable to be inserted in a rail attached to a background surface.

The known covers which can be combined to form a cover system have several disadvantages. Normally all these systems require one or more separate parts, like the rail mentioned above, in order to join the covers together. The known systems do not allow an unlimited number of covers to be joined together without using separate connection parts. Furthermore, diskettes or compact discs stored in covers forming a part of the cover system are not easily accessible even for the purpose of checking information provided on the label thereof. Uncoupling a cover from such a system is also difficult normally.

The object of the present invention is to provide a cover having means allowing several identical covers to be joined together on top of each other to form a cover system wherein covers can be turned with respect to each other so that the label on the cover or on the item inside the cover can be easily seen and the contents of the cover can be taken out of the cover at least in most cases.

SUMMARY OF THE INVENTION

The above-described object can be achieved by means of the cover according to the present invention, which cover comprises

- a frame with a first and a second mutually parallel main surface and a surrounding side surface joining the main surfaces at least partially;
- a pivot mechanism extending from the surrounding side surface and intended for joining several identical covers together on top of each other to form a cover system, wherein the covers can be turned with respect to each other in a direction parallel to the main surfaces of the covers, and
- a locking mechanism allowing the pivot mechanisms of two covers to be joined in a certain mutual position but preventing the covers from separating from each other when turned in another mutual position.

According to a preferred embodiment of the present invention, the pivot mechanism used in the cover according to the invention comprises

- a first cylindrical portion with a first diameter;
- a second flange-like cylindrical portion positioned coaxially on said first cylindrical portion on the side of said first main surface of the cover and having a second diameter larger than said first diameter, the plane of the flange being parallel to the main surfaces of the cover; and
- a semi-cylindrical groove on the side of the second main surface of the cover, dimensioned to receive said second flange-like cylindrical portion of another cover.

Further according to the preferred embodiment of the present invention, the locking mechanism used in the cover according to the invention comprises

- a semi-circular locking surface extending from said second main surface of the cover; and
- a semi-circular indent on the first main surface of the cover for receiving said semi-circular locking surface of another cover in order to prevent the covers from separating from each other when they are joined and at least partly turned one on top of the other.

BRIEF DESCRIPTION OF THE DRAWING

In the following, the present invention will be described in more detail with reference to the attached drawing, in which

FIG. 3 shows the pivot and locking mechanism of the preferred embodiment in more detail;

FIG. 4 shows the pivot and locking mechanism of two covers when the covers are joined together;

FIG. 5 shows the pivot and locking mechanism of two covers joined together; and

FIG. 6 shows three covers according to FIG. 1 that are joined together and positioned in a wedge-like formation with respect to each other.

DESCRIPTION OF THE PREFERRED EMBODIMENT

Figure 1:
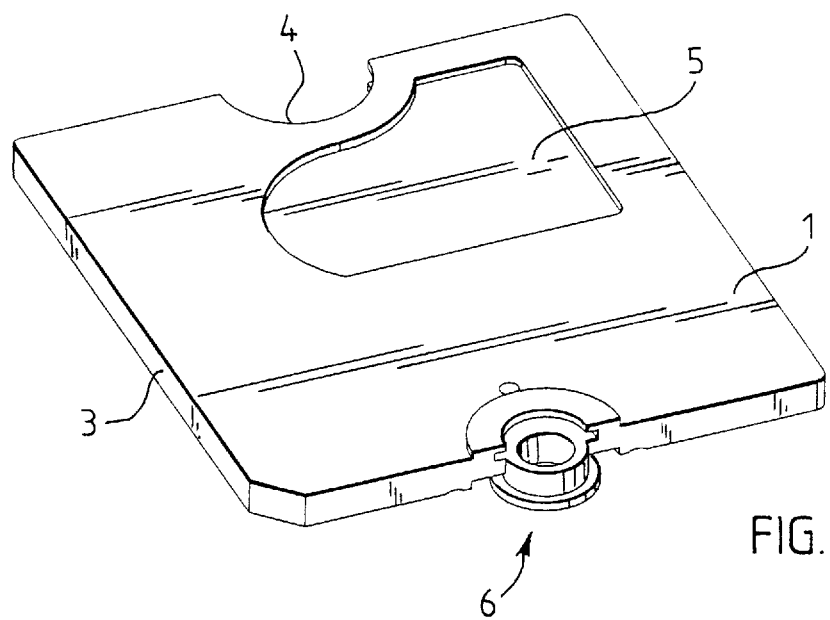
FIG. 1 shows the preferred embodiment of the present invention seen from the side of one of the main surfaces.

FIG. 1 shows the preferred embodiment of the present invention in the form a diskette cover. The cover of FIG. 1 comprises a frame with a first and a second mutually parallel main surface 1 and 2. These main surfaces are joined together with a surrounding side surface 3. The side surface 3 does not cover the fourth side of the generally rectangular main surfaces 1 and 2. The fourth side has been left open for the insertion of a diskette (not shown). In order to make the diskette easily accessible, the main surfaces 1 and 2 have been formed with a semi-circular cutout 4 on the edge of the fourth side of the main surfaces. The main surface 1 has also been provided with a window 5 so that the label of a diskette inserted in the cover can be seen from this window.

Figure 2:
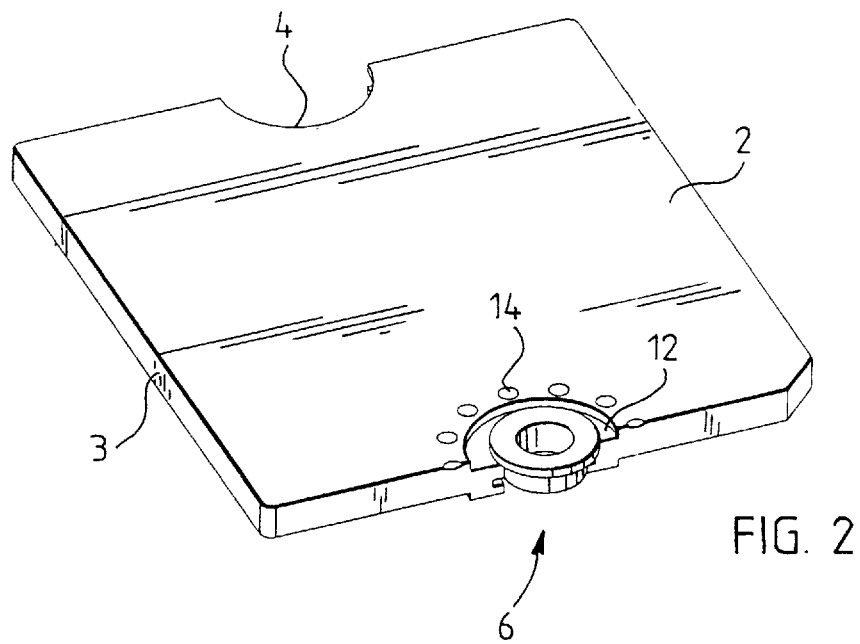
FIG. 2 shows the cover of FIG. 1 seen from the side of the other main surface.

According to the invention, the cover shown in FIGS. 1 and 2 comprises a pivot and locking mechanism generally denoted by reference numeral 6, so that identical covers can be joined on top of each other to form a cover system in which all covers can be turned with respect to each other in a direction parallel to the main surfaces of the covers. The pivot and locking mechanism 6 has been attached to the surrounding side surface 3 of the cover such that half of it is situated inside the surrounding side and the other half extends outside the surrounding side surface 3. The pivot and locking mechanism 6 is formed such that it allows the pivot mechanisms of two covers to be joined in a certain mutual position but prevents the covers from separating from each other when they are turned to another mutual position.

The structure and operation of the pivot and locking mechanism is shown in more detail in FIGS. 3–5. The pivot function and the locking function can be separated from each other and, accordingly, in the following description different parts of the pivot and locking mechanism are referred to as relating either to the pivot mechanism or to the locking mechanism.

Starting from the pivot mechanism, it comprises a first cylindrical portion 7. A second flange-like cylindrical portion 8 is coaxially attached to the first cylindrical portion 7 on the side of the main surface 2 of the frame. This flange-like cylindrical portion 8 has a diameter which is larger than the diameter of the first cylindrical portion 7. The plane of the flange 8 is parallel to the main surface 2 of the cover. Further, the pivot mechanism comprises a semi-cylindrical groove 9 on the side of the second main surface 1 of the cover. This groove 9 is dimensioned to receive the flange 8 of another cover when two covers are joined to each other. A through hole 10 is also provided through the first and the second cylindrical portion 7 and 8 of the pivot mechanism. This through hole 10 has several uses as will be described later.

The locking mechanism of the pivot and locking mechanism 6 comprises a semi-circular locking surface 11 projecting from the second main surface 1 of the cover. As can be seen from FIG. 3, this semi-circular locking surface forms the other side surface of the grove 9. Further, the locking mechanism comprises a semi-circular indent 12 on the first main surface 2 of the cover for receiving the semi-circular locking surface 11 of another cover and for preventing the covers from separating from each other when they are joined and at least partially turned on top of each other. As can be seen from FIG. 3, the semi-circular locking indent 12 is coaxial with the flange-like cylindrical portion 8 of the pivot mechanism.

FIGS. 4 and 5 show how two identical covers according to the invention can be joined together by using the pivot and locking mechanism. In FIG. 4, the pivot and locking mechanisms of two covers A and B have been shown in the position in which they are joined together. The joining is carried out simply in such a way that the flange 8 of the second cover B is inserted in the groove 9 of the first cover A. In order that this joining could be possible, the covers have to be in the mutual position shown in FIG. 4, in other words the covers have to be in a mutual position in which the covers extend to opposite directions from the central axis of the through hole 10 of the covers.

When the covers are turned with respect to each other in a direction parallel to the main surfaces of the covers, the position showing in FIG. 5 can be achieved. In this position the covers are positioned totally one on top of the other. In this position the semi-circular locking surface 11 of cover A is totally inside the semi-circular indent 12 of cover B and prevents the covers from separating from each other. As a matter of fact, the separation of the covers is not possible whenever cover A and cover B have been turned, into a position in which they are at least partly positioned one on top of the other.

FIG. 6 shows three covers according to the invention that are joined together on top of each other and turned into the form of a fan or a wedge. As can be understood from the above description, covers that are joined to form an assembly like the one shown in FIG. 6 can be turned with respect to each other without separating them from each other in such a way that the labels on the diskettes inserted in the covers can be seen through the windows of the covers. It can also be understood that the number of covers joined to each other is not limited in any way.

The covers shown in FIGS. 1 to 6 also have some other minor details which make the use and the function of the pivot and the locking mechanism better. One of these details is the small projection 13 formed on the second main surface 1 outside the semi-circular locking surface 11. The small projection 13 works together with several notches 14 formed on the first main surface 2 around the semi-circular indent 12. When two covers are turned one on top of the other as shown in FIG. 5, the projection 13 is coincident with one of the notches 14. This causes a weak locking of the turning position of the covers with respect to each other. In the same way the covers are weakly locked whenever the projection 13 becomes coincident with one of the notches 14. In such a way the turning movement of two covers one on top of the other can be controlled more easily. When the projection is not coincident with one of the notches 14 it tightens up the pivot and locking mechanism 6. In such a way, the mutual position of two covers can be controlled more easily even if the projection 13 is not coincident with one of the notches 14.

Another useful detail of the pivot and locking mechanism 6 is the through hole 10 extending through the cylindrical parts 7 and 8. This through hole can be used for several useful purposes. Through this hole the cover can easily be attached to a holder by inserting one of the metal parts of the holder through the hole 10. In the same way, the diskette cover can be easily supported on a board for example by a nail or a pin inserted through this hole 10.

In the preferred embodiment shown in FIGS. 1–6, the flange 8 of the pivot mechanism extends by its thickness over the first main surface 2 of the cover. This can be seen best from FIGS. 4 and 5. The position of the pivot and the locking mechanism 6 in the axial direction of the through hole 10 is, however, not limited to this embodiment. It can be easily understood that a corresponding pivot and locking mechanism can be formed even if the axial position of this mechanism with respect to the main surfaces 1 and 2 differs somewhat from the shown embodiment. In this way the semi-circular locking surface 11 could be on the same level as the main surface 1. In such an embodiment, the flange 8 would extend further from the main surface 2 than in the shown embodiment.

The cover according to the present invention has been described above based on only one preferred embodiment, i.e. a diskette cover. The cover according to the present invention can be used, however, for several different purposes by only redesigning the frame of the cover. In such a cover the pivot and locking mechanism could be the same as shown in FIGS. 1 to 6. Accordingly, the cover according to the present invention can be easily designed to be used in connection with compact discs or CD-ROMs, for example. However, all such redesigned embodiments of the present invention do not deviate from the scope of protection defined by the attached claims.

I claim:
1. Cover comprising:
   a frame with a first main surface and a second parallel main surface and a surrounding side surface joining the main surfaces at least partially;
   a pivot mechanism extending from the surrounding side surface and intended for joining several identical covers together on top of each other to form a cover system, wherein the covers when joined together can only be moved relative to each other by being turned with respect to each other in a direction parallel to the main surfaces of the covers, and
   a locking mechanism allowing the pivot mechanisms of two covers to be joined when the pivot mechanisms are in a certain position with respect to each other and preventing the covers from separating from each other when the pivot mechanisms are turned in another position with respect to each other, said locking mechanism comprising a semi-circular locking surface extending from said second main surface of the cover and a semi-circular indent on the first main surface of the cover for receiving said semi-circular locking surface of another cover in order to prevent the covers from separating from each other when the covers are joined together at their respective said pivot mechanisms and at least partly turned one on top of the other.

2. Cover according to claim 1, wherein said pivot mechanism comprises a first cylindrical portion with a first diameter;

a second cylindrical portion positioned coaxially on said first cylindrical portion on the side of said first main surface of the cover and having a second diameter larger than said first diameter, the plane of the second cylindrical portion being parallel to the main surfaces of the cover; and a semi-cylindrical groove on the side of the second main surface of the cover, dimensioned to receive said second cylindrical portion of another cover.

3. Cover according to claim 2, comprising an axial through hole through said first and second cylindrical portions of said pivot mechanism.

4. Cover comprising a frame with a first and a second mutually parallel main surface and a surrounding side surface joining the main surfaces at least partially;

a pivot mechanism extending from the surrounding side surface and intended for joining several identical covers together on top of each other to form a cover system, in which the covers can be turned with respect to each other in a direction parallel to the main surfaces of the covers, and a locking mechanism allowing the pivot mechanisms of two covers to be joined when the pivot mechanisms are in a certain position with respect to each other and preventing the covers from separating from each other when the pivot mechanisms are turned in another position with respect to each other;

said pivot mechanism comprising a first cylindrical portion with a first diameter;

a second cylindrical portion positioned coaxially on said first cylindrical portion on the side of said first main surface of the cover and having a second diameter larger than said first diameter, the plane of the second cylindrical portion being parallel to the main surfaces of the cover; and a semi-cylindrical groove on the side of the second main surface of the cover, dimensioned to receive said second cylindrical portion of another cover;

said locking mechanism comprising a semi-circular locking surface extending from said main surface of the cover; and a semi-circular indent on the first main surface of the cover for receiving said semi-circular locking surface of another cover in order to prevent the covers from separating from each other when they are joined and at least partly turned one on top of the other.

5. Cover according to claim 4, comprising an axial through hole through said first and second cylindrical portions of said pivot mechanism.

6. Cover according to claim 4, wherein said semi-circular locking indent is coaxial with said second cylindrical portion of the pivot mechanism.

7. Cover according to claim 4, wherein said second cylindrical portion has a thickness and extends by said thickness from the plane of said first main surface.

8. A cover comprising:

first and second surfaces parallel to each other and joined together partially at their perimeters by a side wall;

a connector extending from said side wall and capable of making a pivotable connection with said connector of another said cover, under said pivotable connection said covers being movable with respect to each other only in a direction parallel to said first and second surfaces and said covers being joinable and separable at said connector only when oriented with respect to each other in a predetermined position, said connector comprising a cylindrical portion extending from said side wall and having an outwardly extending flange from one end of said cylindrical portion, and an arcuate groove in said sidewall and adjacent an end of said cylindrical portion opposite said outwardly extending flange, said flange of another said cover being slidably engageable with said arcuate groove as an aspect of said pivotable connection.

9. A cover according to claim 8, further comprising a partially circular surface extending from and above one of said first and second surfaces and in part forming a wall of said groove, and a partially circular indent on the other one of said first and second surfaces, said partially circular surface being slidably moveable against and retainable by said partially circular indent of another said cover when said covers are joined together by said pivotable connection.

10. A cover according to claim 8, wherein said connector has a hole coaxial with said cylindrical portion and said outwardly extending flange.

11. A cover according to claim 9, wherein said partially circular indent is coaxially aligned with said partially circular surface of another said cover when two of said cover are joined together by said pivotable connection.

* * * * *